W. H. SHERBONDY.
ELECTRICAL SYSTEM OF DISTRIBUTION.
APPLICATION FILED NOV. 3, 1910.
989,305.
Patented Apr. 11, 1911.
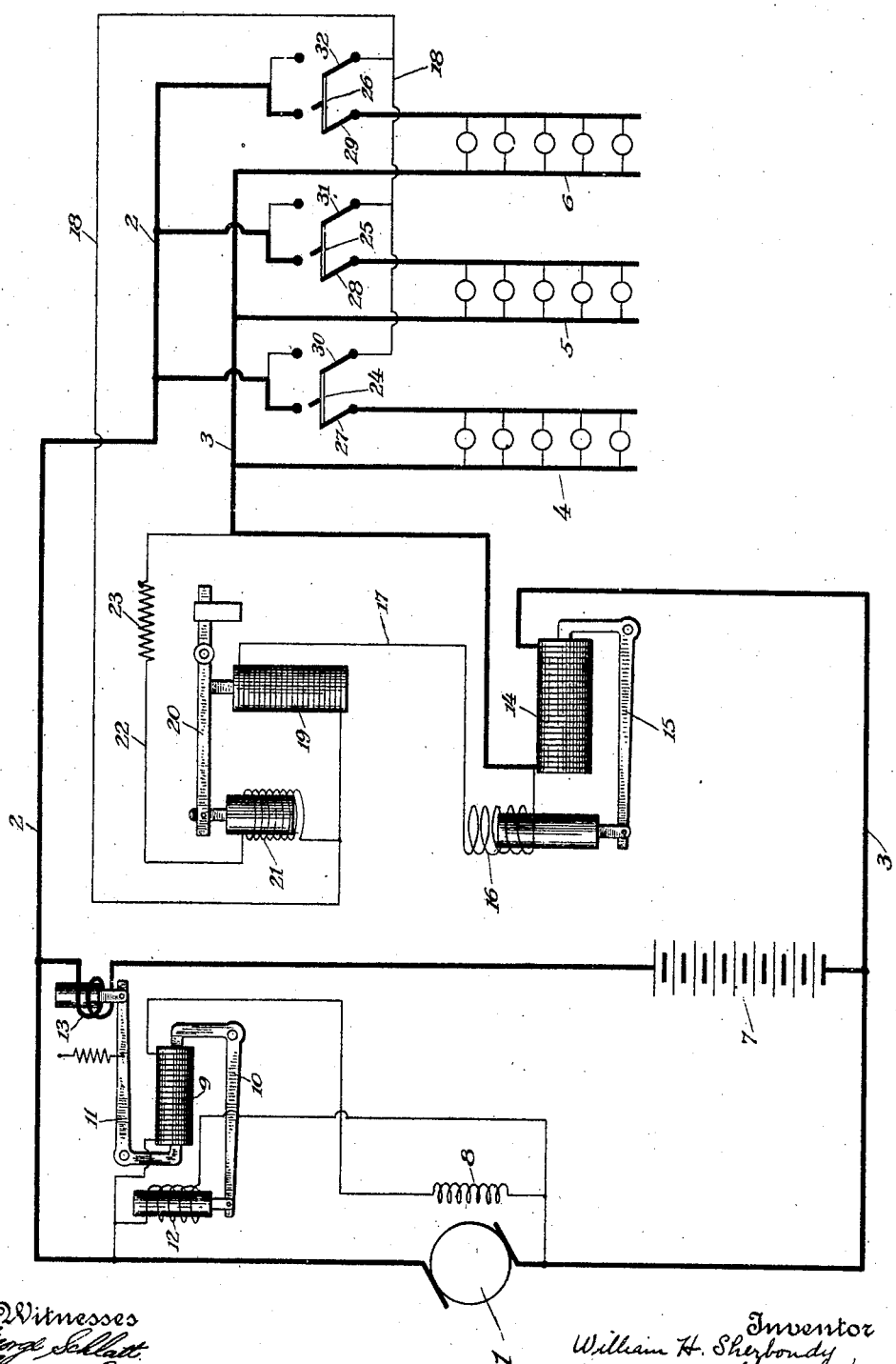

UNITED STATES PATENT OFFICE.

WILLIAM H. SHERBONDY, OF FORT WAYNE, INDIANA, ASSIGNOR TO GOULD COUPLER COMPANY, A CORPORATION OF NEW YORK.

ELECTRICAL SYSTEM OF DISTRIBUTION.

989,305.  Specification of Letters Patent.  Patented Apr. 11, 1911.

Application filed November 3, 1910. Serial No. 590,424.

*To all whom it may concern:*

Be it known that I, WILLIAM H. SHERBONDY, a resident of Fort Wayne, Allen county, State of Indiana, have invented certain new and useful Improvements in Electrical Systems of Distribution, of which the following is a specification.

My invention relates to improvements in electrical systems of distribution and more particularly to electrical systems for the lighting of railway cars in which a storage battery is employed together with a plurality of work circuits and means for regulating the voltage applied to the work circuits.

One object of my invention is to provide a simple and effective arrangement whereby when all of the work circuits are disconnected the means for regulating the voltage upon the work circuits will be disconnected, but when any one of the work circuits is connected or put in operation the regulating means will be operatively connected or energized at the same time.

Further objects, features and advantages will more clearly appear from the detailed description given below, taken in connection with the accompanying drawing which diagrammatically illustrates a system embodying a preferred form of my invention.

Referring to the drawing, 1 indicates the main generator designed to be driven by a car axle. The main generator 1 supplies a distribution circuit 2, 3, to which are connected a plurality of work circuits 4, 5, 6 connected across the distribution circuit 2, 3, and parallel with the work circuits is a storage battery 7.

The main generator 1 is provided with a shunt field 8 and in series with the field 8 is a carbon pile resistance 9 automatically operated to regulate the voltage of the main generator 1. For this purpose the carbon pile is controlled by two levers 10 and 11, lever 10 being operated by a solenoid 12, connected across the terminals of the generator to be responsive to voltage changes thereof and lever 11, being controlled by a solenoid 13 connected in series with the storage battery 7, to be responsive to current changes of the battery.

In operation with the battery in a low state of charge, the solenoid 13 regulates the main generator to maintain a substantially constant charging current. When, however, the battery becomes sufficiently charged, and its voltage and the generator voltage have risen sufficiently, the voltage solenoid 12 comes into operation to prevent any substantial further increase in voltage of the generator and battery. This action cuts down the charging current until the battery reaches a substantially floating condition.

In series in the main 3 is a carbon pile rheostat or regulator 14 connected between the battery and work circuits for regulating the voltage applied to the work circuits. This carbon pile 14 is controlled by a lever 15 operated by a solenoid 16. The solenoid 16 is connected across the work circuits 4, 5 and 6 by means of conductors 17 and 18 and in series with the solenoid 16 is a carbon pile 19 controlled by a lever 20, lever 20 being operated by a solenoid 21 connected across the work circuits by means of conductors 18 and 22, the conductor 22 having a fixed resistance 23 therein in order to prevent an excessive amount of current from flowing therethrough.

In operation the rheostat 14 is controlled in order to maintain the voltage upon the work circuits 4, 5 and 6 substantially constant. If a rise in voltage upon these work circuits should tend to take place the strength of solenoid 21 would increase, thereby greatly decreasing the resistance of carbon pile rheostat 19, thereby greatly increasing the current in the conductor 17 and solenoid 16. This causes the lever 15 to insert resistance in the main 3 and thus bring the voltage of the work circuit substantially back to its normal value. Similarly, when a decrease in voltage on the work circuits tends to take place, the strength of solenoid 21 decreases, thereby inserting resistance at 19 so that the strength of solenoid 16 is greatly decreased, thereby allowing the lever 15 to compress the piles of rheostat 14 and bring the voltage applied to the work circuits substantially back to its normal value.

For connecting and disconnecting the work circuits 4, 5 and 6, I provide double pole switches 24, 25 and 26 respectively. The switch 24 has one pole 27 for directly connecting and disconnecting its work circuit, the switch 25 has one pole 28 for directly connecting and disconnecting its work circuit and the switch 25 has one pole 29 for directly connecting and disconnecting its work circuit. The conductor 18 is a common conductor which is connected to each of the other poles 30, 31 and 32 of the double pole switches 24, 25 and 26.

In operation, when all of the switches 24, 25 and 26 are open and the work circuits disconnected, the conductor 18 is entirely disconnected at one end. If the double pole switch be thrown so as to connect or energize the work circuit 4, the conductor 18 will be connected directly across the work circuit 4 so as to energize the solenoids or electro-magnets 16 and 21 and thus put the regulator 14 into operation. In a similar manner, if the work circuit 5 is connected by throwing the switch 25, the pole 31 of said switch will connect the common conductor 18 directly across the work circuit 5 so that the regulating apparatus will be responsive to voltage changes of the work circuit. Likewise, if the double pole switch 26 be thrown so that the pole 29 will connect the work circuit 6, the pole 32 will connect the conductor 18 directly across the work circuit 6, thus making the electro-magnets 21 and 16 responsive to voltage changes of the work circuit 6.

It will thus appear that when all of the work circuits are disconnected by opening the double pole switches the lamp regulator 14 or its controlling electro-magnets are disconnected and deënergized, but when any one of the double pole switches is thrown in order to connect and energize any one of the work circuits respectively, the electro-magnets 16 and 21 will be connected and energized and put into operation.

From the above it will appear that I have provided a simple and efficient means whereby the lamp regulator 14 may be cut out of operation whenever all the work circuits are disconnected, but will be thrown into operation whenever any one of the work circuits is in use and this irrespective of which one of the work circuits is in use and irrespective of how many of the work circuits are energized.

Although I have described my improvements in great detail, nevertheless I do not desire to be limited to such details except as clearly pointed out in the appended claims.

Having fully and clearly described my invention, what I claim as new and desire to secure by Letters Patent is:

1. In an electric car lighting system, a source of electrical supply, a plurality of work circuits arranged to be fed by the source, means for regulating the voltage applied to the work circuits, said means including electro-magnetic apparatus responsive to voltage changes of the work circuits, a switch for each work circuit and connections whereby when all of the switches are open said electro-magnetic apparatus will be cut out of circuit and when any one of the work circuits is energized said electro-magnetic apparatus will be in circuit.

2. The combination of a source of electrical supply, a plurality of work circuits arranged to be fed by the source, a rheostat between the battery and work circuits, an electro-magnet for controlling the operation of the rheostat, a switch for disconnecting each work circuit and connections whereby when all of said switches are open the electro-magnet will be deënergized and when any one or more of said switches are closed the electro-magnet will be energized and operative.

3. The combination of a source of electrical supply, a plurality of work circuits operatively connected thereto, a switch for disconnecting each work circuit, means for regulating the voltage applied to the work circuits, said means including an electro-magnet, and connections whereby when all of said switches are open, the electro-magnet will be deënergized or disconnected and when any one of said switches is closed the electro-magnet will be energized or connected.

4. In an electrical system of distribution, a source of electrical supply, a plurality of work circuits in operative relation thereto, a regulator responsive to electrical fluctuations of the system for regulating the voltage applied to the work circuits, a switch for disconnecting each work circuit, and connections whereby when all of said switches are open the regulator will be deënergized or disconnected and when any one of said switches is closed the regulator will be energized or connected.

5. In an electrical system of distribution, a source of electrical supply, a plurality of work circuits in operative relation thereto, a regulator responsive to electrical fluctuations of the system for regulating the voltage applied to the work circuits, a switch for disconnecting each work circuit, and connections whereby when all of said switches are open the regulator will be deënergized or disconnected and when any one of said switches is closed the regulator will be energized or connected, each of said switches being double pole switches, one pole for connecting and disconnecting its work circuit and the other pole for connecting and disconnecting the regulator.

6. The combination of a source of electrical supply, a plurality of work circuits operatively connected thereto, a switch for disconnecting each work circuit, means for regulating the voltage applied to the work circuits, said means including an electro-magnet, and connections whereby when all of said switches are open, the electro-magnet will be deënergized or disconnected and when any one of said switches is closed the electro-magnet will be energized or connected, said switches being double pole switches, one pole for connecting and disconnecting the work circuits and the other pole for connecting and disconnecting the electro-magnet.

7. In an electric car lighting system, a source of electrical supply, a plurality of work circuits operatively connected thereto, a switch for disconnecting each work circuit, means for regulating the voltage applied to the work circuits, said means including an electro-magnet, and connections whereby when all of said switches are open, the electro-magnet will be deënergized or disconnected and when any one of said switches is closed the electro-magnet will be energized or connected, each of said switches being a double pole switch, one pole for connecting and disconnecting its work circuit and the other pole for connecting and disconnecting the electro-magnet, said last mentioned poles being connected together and to the electro-magnet by a common conductor.

In testimony whereof, I have signed my name to this specification, in the presence of two subscribing witnesses.

WILLIAM H. SHERBONDY.

Witnesses:
C. W. GOULD,
G. R. BERGER.